J. S. Boicourt.
Railroad Weed-Cutter.
Nº 72263          Patented Dec. 17, 1867.
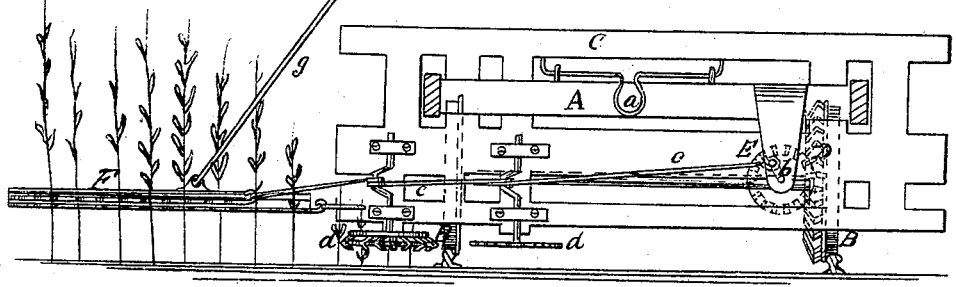
Fig. 1.
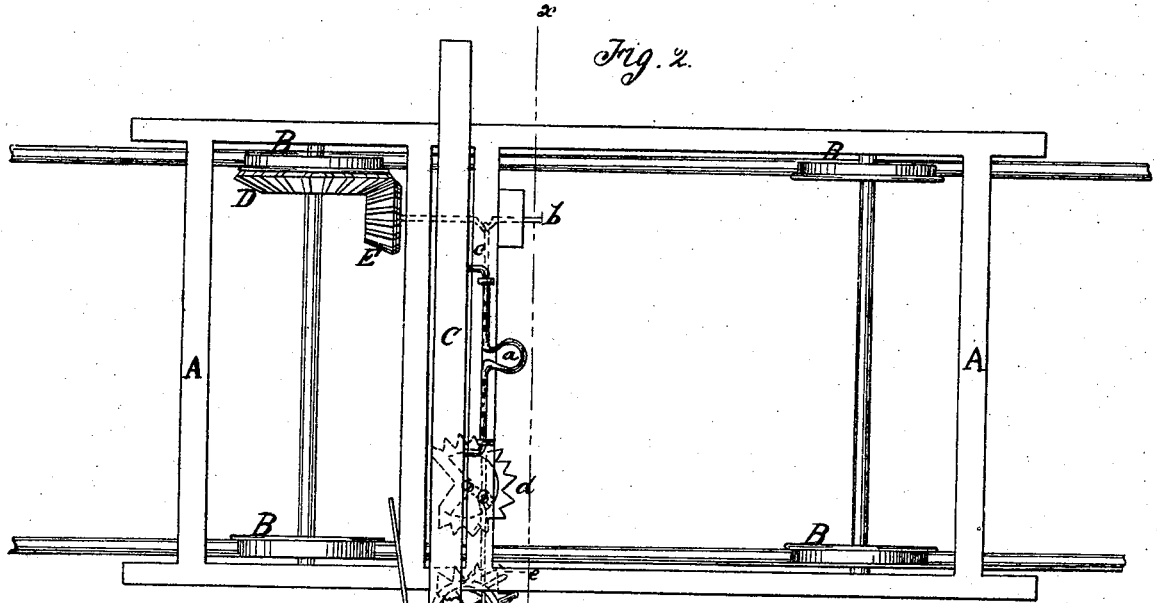
Fig. 2.
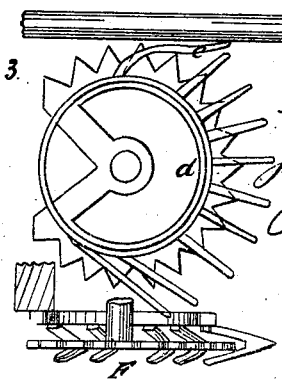
Fig. 3.
Fig. 4.
Witnesses
Theo. Tusche
J. Alison Fraser
Inventor
J. S. Boicourt
Per Munn & Co.
Attorneys

United States Patent Office.

J. S. BOICOURT, OF BOONSBORO, IOWA.

Letters Patent No. 72,263, dated December 17, 1867.

IMPROVED RAILROAD WEED-CUTTER.

The Schedule referred to in these Letters Patent and making part of the same.

TO ALL WHOM IT MAY CONCERN:

Be it known that I, J. S. BOICOURT, of Boonsboro, in the county of Boone, and State of Iowa, have invented a new and improved Railroad Weed-Cutter; and I do hereby declare that the following is a full, clear, and exact description thereof, which will enable others skilled in the art to make and use the same, reference being had to the accompanying drawings, forming part of this specification.

Figure 1 is a rear end sectional view of a railroad-truck with my weed-cutting devices attached, cut in the line $x\,x$, fig. 2.

Figure 2 is a top view of the same.

Figure 3, a view of a circular cutter detached.

Figure 4, a view of a straight cutter detached.

Similar letters of reference indicate corresponding parts.

This invention relates to a new and useful improvement in a device for cutting weeds on a railroad-track, and consists in attaching cutters, either circular or straight, to the truck of a car, which are worked by gear, deriving its motion from the wheels of the car, as hereinafter more particularly described.

A is the truck of a railroad-car, mounted, as usual, on the wheels B B. A cross-frame, C, is fitted on the truck-frame A, in such manner that it can be raised and lowered by means of a lever, $a$, for the purpose of lifting the cutters, when necessary, above the switch-joints or other obstructions in the track that may project above the level of the cutters when in operation. On the inside of one of the wheels, B, is a bevel-gear, D, that engages a pinion, E, hung on a crank-shaft, $b$, which is connected by a pitman, $c$, with circular teethed cutters $d\,d$, placed on each side of a rail, as shown in fig. 1, and provided with long guards or guide-fingers $e$, on the side next the rail, for the purpose of pushing the weeds up to the cutters, which cut them off as the car moves forward.

For cutting the weeds outside of the track some distance, a straight cutter-bar, F, may be attached to the pitman $c$, to operate it, and it is raised or lowered as desired by a rod, $g$.

The operation of these devices is obvious. As the car moves forward the motion of the wheel working the gear D will operate the cutters, which are constructed with teeth working against fingers in the usual way in mowing-machines, to cut down the weeds growing on a railroad-track.

Having thus described my invention, what I claim as new, and desire to secure by Letters Patent, is—

The arrangement of the circular cutters $d$, and the straight cutter-bar F, or either of them, in combination with a railroad-truck, A, substantially as and for the purpose herein described.

J. S. BOICOURT.

Witnesses:
W. H. THRIFT,
ROBT. S. PARKER.